United States Patent
Zou et al.

(10) Patent No.: US 8,532,660 B2
(45) Date of Patent: Sep. 10, 2013

(54) METHOD AND APPARATUS FOR DIRECTING TRAFFIC BETWEEN OVERLYING MACROCELLS AND MICROCELLS

(75) Inventors: Jialin Zou, Randolph, NJ (US); Subramanian Vasudevan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 396 days.

(21) Appl. No.: 12/838,130

(22) Filed: Jul. 16, 2010

(65) Prior Publication Data

US 2011/0250891 A1    Oct. 13, 2011

Related U.S. Application Data

(60) Provisional application No. 61/342,167, filed on Apr. 10, 2010.

(51) Int. Cl.
*H04W 36/00* (2009.01)
*H04W 72/00* (2009.01)
*H04W 4/00* (2009.01)

(52) U.S. Cl.
USPC ........... 455/436; 455/437; 455/438; 455/439; 455/442; 455/443; 455/444; 455/453; 370/331

(58) Field of Classification Search
USPC ................................. 455/443, 436
See application file for complete search history.

(56) References Cited

U.S. PATENT DOCUMENTS

| | | | | |
|---|---|---|---|---|
| 5,513,380 A | * | 4/1996 | Ivanov et al. ................. | 455/441 |
| 6,208,863 B1 | * | 3/2001 | Salonaho ...................... | 455/444 |
| 6,285,884 B1 | * | 9/2001 | Vaara ............................ | 455/441 |
| 6,640,102 B2 | * | 10/2003 | Frodigh et al. ............... | 455/436 |
| 6,873,847 B2 | * | 3/2005 | Shimono et al. .............. | 455/441 |
| 7,286,826 B2 | * | 10/2007 | Kim et al. ..................... | 455/444 |
| 2009/0149184 A1 | * | 6/2009 | Hohne et al. ................. | 455/437 |

FOREIGN PATENT DOCUMENTS

| EP | 1 292 164 A1 | 12/2003 |
|---|---|---|
| EP | 1 865 732 A1 | 12/2007 |
| EP | 2 096 892 A2 | 2/2009 |

OTHER PUBLICATIONS

Written Opinion dated Jul. 1, 2011.
International Search Report PCT/US2011/030869 dated Jul. 1, 2011.

* cited by examiner

*Primary Examiner* — Huy C Ho
(74) *Attorney, Agent, or Firm* — Williams, Morgan & Amerson

(57) ABSTRACT

The present invention provides embodiments of methods for directing traffic between cells of different sizes. One embodiment of the method includes determining, at a mobile unit, whether to hand off from a source cell to a target cell based on information indicating sizes of coverage areas of the source cell and the target cell.

18 Claims, 8 Drawing Sheets

METHOD AND APPARATUS FOR DIRECTING TRAFFIC BETWEEN OVERLYING MACROCELLS AND MICROCELLS

CROSS REFERENCE TO RELATED APPLICATIONS

This application claims priority to U.S. Provisional Patent Application 61/342,167, filed on Apr. 10, 2010.

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. Each base station provides wireless connectivity within a geographical region that is referred to as a cell and/or a sector. Conventional base stations can transmit signals using a predetermined amount of available transmission power, which in some cases is approximately 35 W for a base station that serves a macrocell. The range of the macrocell is determined by numerous factors including the available transmission power, angular distribution of the available power, obstructions within the macrocell, environmental conditions, and the like. For example, the range of a macrocell can vary from as little as 300 m in a densely populated urban environment to as much as 10 km in a sparsely populated rural environment. The coverage area can also vary in time if any of these parameters changes.

Other types of access points or access networks can also be used to provide wireless connectivity to mobile units. For example, lower power access points (which may also be referred to as base stations, base station routers, home e-node-Bs, and the like) may be deployed in a business campus, a public area such as the train station or a food court, a residence or building to provide wireless connectivity to the occupants of the residence or the building. Base stations or access points deployed in a residence are typically referred to as home base station routers, home eNBs, femtocells, microcells, picocells, and the like because they are intended to provide wireless connectivity to a much smaller area (e.g., a microcell, femtocell, or picocell) that encompasses a residence. Low range access devices such as femtocells have a much smaller power output than conventional base stations that are used to provide coverage to macrocells. For example, a typical femtocell or microcell has a transmission power on the order of 10 mW. Consequently, the range of a typical femtocell is much smaller than the range of a macrocell. For example, a typical range of a femtocell is less than or on the order of about 100 m. Clusters of femtocells or microcells may also be deployed to provide coverage to larger areas and/or to more users.

Heterogeneous networks include a mixture of different types of devices for providing wireless connectivity to different sized cells. For example, femtocells are expected to be deployed in conjunction with a macro-cellular network in an overlay configuration. For another example, a macro-cellular network may be used to provide wireless connectivity to a neighborhood that includes numerous residences. A mobile unit traveling through the neighborhood or located in one of the residences can access the wireless communication system using the macro-cellular network. Individual femtocells can be deployed in one or more of the residences to provide overlay coverage within (or near) the residence. Clusters of femtocells can also be deployed in one or more of the buildings to provide overlay coverage within (or near) the building. In either case, there will be a one-to-many relationship between the macrocells and the femtocells within the coverage area. Heterogeneous networks can also include microcells, picocells, and relays that operate in different sized geographical areas. However, the devices deployed in heterogeneous networks are typically classified into two major types: (1) large cells that include macrocells and macrocell relays and (2) small cells that include microcells, pico cells, HeNBs, femtocells, and small relays.

As the user moves throughout the geographic areas served by the large cells and the overlaying smaller cells, the user equipment can be handed off between the large cells and/or the small cells. The basic condition for initiating a handover is that the signal strength from the candidate target base station or cell is stronger/better than the signal strength from the current serving base station or cell. However, simply handing off a mobile unit as soon as the target base station appears to have a stronger signal than the serving base station can lead to a number of problems. For example, the signal strengths near the boundaries between a serving cell and its neighbor cells are (almost by definition) nearly equal. The signal strength received by each mobile unit near a boundary is therefore approximately equal and relatively small deviations can cause the relative signal strengths to flip-flop. The strength of the signals received by a particular mobile unit may also vary rapidly due to movement of the mobile unit and/or environmental changes. Consequently, the mobile unit may be rapidly handed back and forth (a phenomenon known as ping-ponging) if the hand off is performed based only on the relative signal strength. Ping-ponging consumes valuable overhead unnecessarily, degrades the perceived call quality, and can lead to dropped calls.

Handovers can be made more robust by using a more sophisticated handoff condition. For example, conventional handovers are performed when the signal strength from the candidate cell is better than the signal strengths from the current serving cell by a certain amount determined by a hysteresis value and offset values. Each cell uses a single value of the hysteresis, e.g., 2 dB. Each cell also maintains different values for the offsets that are applied to handoffs between the cell and its neighbor cells. For example, the offset value for handoffs between a serving cell and a first neighbor cell may be 1 dB and the offset value for handoffs between the serving cell and a second neighbor cell may be 2 dB. A time-to-trigger (TTT) is used to delay the hand off until the "better" conditions on the target cell persist for at least the TTT duration. In 3G technologies, the hysteresis, offset values, and, TTT are set to one golden set that is applied to all cells.

However, the conventional handoff techniques used by active mobile units and cell reselection techniques used by idle mobile units do not distinguish between large cells and small cells. Consequently, heterogeneous networks may not be able to effectively direct and/or distribute traffic between large cells and potentially overlapping small cells. The inability to smoothly distribute users within the heterogeneous network may lead to load imbalances and other problems.

The operation of heterogeneous networks may be further complicated by the use of different standards and/or protocols for the different types of access points. Exemplary network services can be provided by different network elements using different carriers that operate according to different transmission protocols including High Rate Packet Data (HRPD), Long Term Evolution (LTE), Universal Mobile Telecommunications System (UMTS), and the like. Each of these network services use carriers that can be defined in terms of a particular radio access technology (RAT) and the radio access technology that defines each different transmission protocol typically requires a unique radiofrequency configuration for transmission and reception of communications based on the radio access technology.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, methods for directing traffic between cells of different sizes are provided. One embodiment of the method includes determining, at a mobile unit, whether to hand off from a source (or serving) cell to a target cell based on information indicating sizes of coverage areas of the source cell and the target cell. In one other embodiment, a method is provided including transmitting, from a source cell, information indicating a priority that can be used by a mobile unit to determine to hand off from the source cell to a target cell with a probability. The priority may be determined by the network based on a size of a coverage area and the loading of the source cell(s) and the handoff or reselection target cell(s).

BRIEF DESCRIPTION OF THE DRAWINGS

The disclosed subject matter may be understood by reference to the following description taken in conjunction with the accompanying drawings, in which like reference numerals identify like elements, and in which.

Figure 1A:
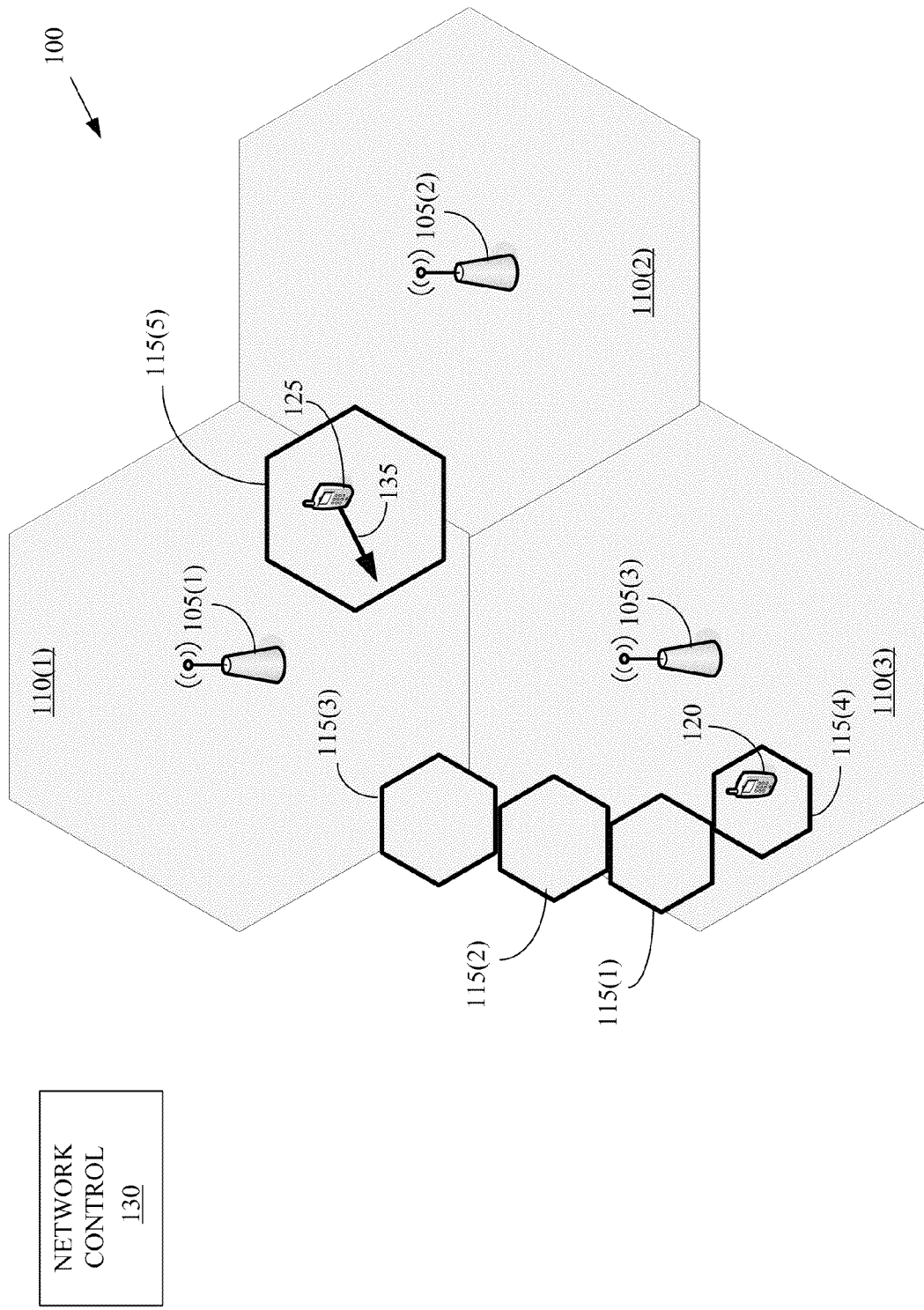
FIG. 1A conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes techniques for controlling handoffs of active mobile devices and/or cell reselection by idle mobile units based on sizes of coverage areas of the cells supported by a heterogeneous wireless communication system. There may be several factors and/or criteria that can be considered when determining how to direct or distribute traffic between layers of larger macrocells and relatively smaller microcells in the heterogeneous network. Exemplary factors include radio link conditions, load balance between the cells of different sizes, power consumption by user equipment, user equipment mobility, service applications, grade of service, and the like. The techniques described herein allow operators to incorporate multiple factors and/or criteria. In some embodiments, there may be a bias toward relatively small cells. For example, in some cases it may be more likely that small cells support higher per user throughput, e.g., because there may be many fewer users per microcell than per macrocell. For another example, power control and relatively smaller communication distances within a small cell can allow user equipment to save/conserve power. On the other hand, user equipment moving at relatively high speed may be preferentially biased towards larger cells, e.g., to reduce the number of handoffs/cell reselections. Ping-ponging between macrocells and smaller cells should be avoided and conflicts between the different factors and/or criteria resolved.

FIG. 1A conceptually illustrates a first exemplary embodiment of a wireless communication system 100. In the illustrated embodiment, base stations 105(1-3) provide wireless connectivity to a corresponding plurality of macro-cells 110 (1-3). As used herein, the term "macrocell" will be used to refer to cells having a relatively large coverage area. For example, macrocells may have coverage areas defined by ranges on the order of hundreds of meters to tens of kilometers. Although the indices (1-3) can be used to identify individual base stations 105(1), macro cells 110(1), or subsets thereof, these indices may be dropped when referring collectively to the base stations 105 and/or the macro-cells 110. This convention may be applied to other elements depicted in the drawings and referred to using an identifying numeral and one or more distinguishing indices. The macro-cells 110 shown in FIG. 1 correspond to different sectors or coverage areas or cells associated with the base station 105. For example, the base station 105 may include three antennas (or three groups of antennas) that provide wireless connectivity to three sectors associated with the macro-cells 110. However, persons of ordinary skill in the art having benefit of the present disclosure should appreciate that alternative embodiments may include any number of macro-cells 110 and/or base stations 105.

The wireless communication system 100 also includes an overlay network of microcells 115. As used herein, the term "microcell" is used to refer to cells having coverage areas that are relatively smaller than the coverage areas of the macro-cells 110. Exemplary microcells 115 may include femtocells, picocells, home eNBs, and other wireless connection devices having coverage areas less than or on the order of tens of meters. Not all of the microcells 115 may necessarily have the same size coverage area. The microcells 115 may be installed in businesses and/or residences by individual users, companies, or other entities. In the interest of clarity, only five microcells 115 are depicted in FIG. 1. However, persons of ordinary skill in the art having benefit of the present disclosure should appreciate that the wireless communication system 100 may include any number of microcells 115 distributed throughout the wireless communication system 100. Furthermore, although FIG. 1 depicts cells of two distinct sizes, persons of ordinary skill in the art having benefit of the present disclosure should appreciate that in alternative embodiments the system 100 may include cells in many different sizes as well as cells that continuously vary in size and/or shape (perhaps also in time) throughout different ranges of coverage area dimensions.

User equipment, such as the mobile units 120, 125 shown in FIG. 1, can be associated with one or more of the macro-cells 105 and/or one or more of the microcells 115. The mobile units 120, 125 may therefore selectively or preferentially hand off between the macrocells 105 and/or the microcells 115 when they are in the active mode and may selectively or preferentially reselect between the macrocells 110 and/or the microcells 115 when they are in the idle mode. However, basing the handoff/reselection decision exclusively on measured reference signal received powers (RSRPs) may not be effective for redistribution between cells of different sizes because the power measurements of macrocells 105 may not be comparable to power measurements of microcells 115

Figure 1B:
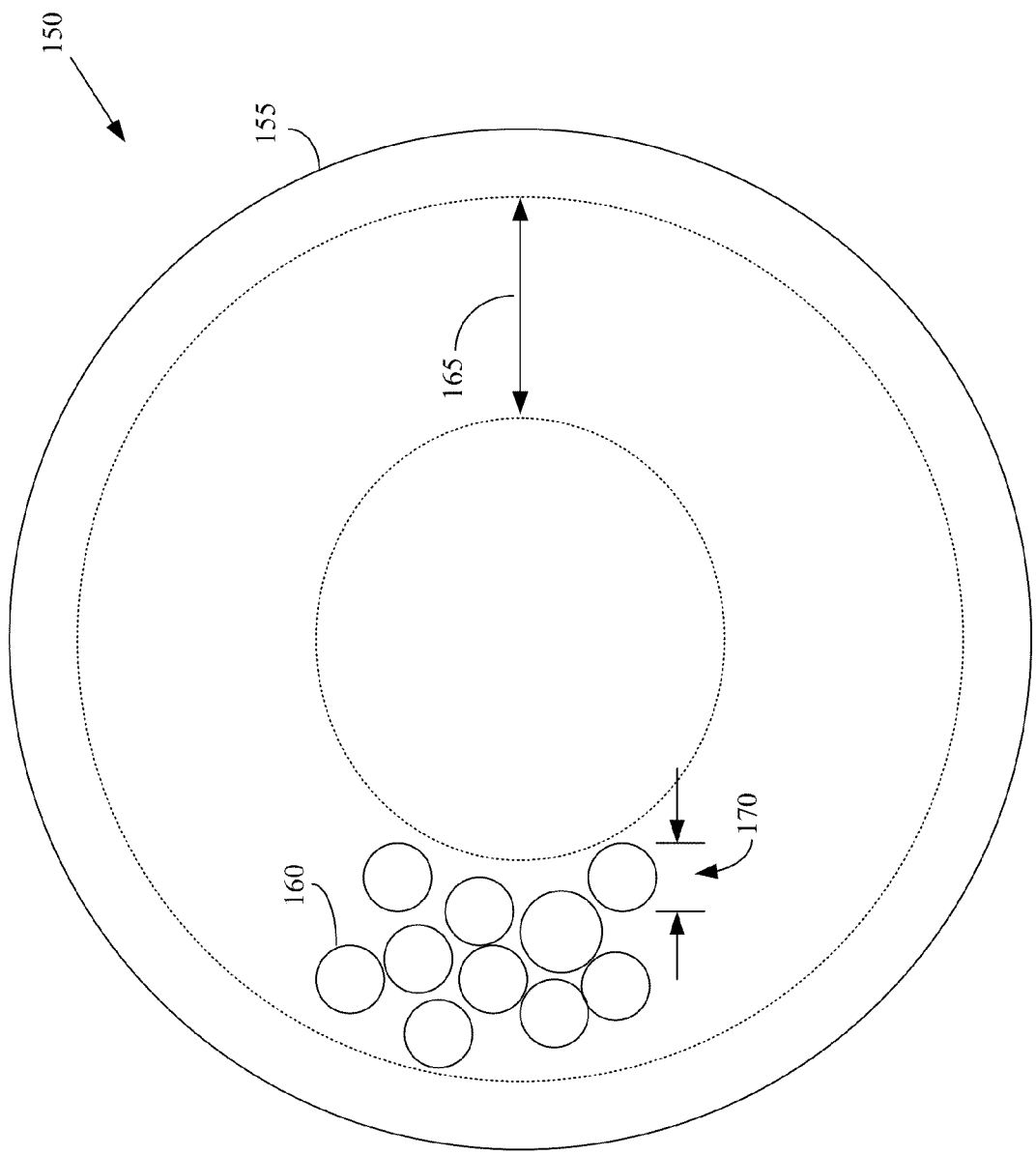
FIG. 1B conceptually illustrates a second exemplary embodiment of a wireless communication system.

FIG. 1B conceptually illustrates a second exemplary embodiment of a wireless communication system 150. In the illustrated embodiment, the wireless communication system 150 includes a macrocell 155 and a cluster of overlapping microcells 160 (only one indicated by a numeral in FIG. 1B). Measurements of the RSRP in the macrocell 155 cover a relatively large dynamic range 165 over the coverage areas of the microcells 160. However, within the microcells 160, measurements of the RSRPs from the individual microcells 160 by different user equipment may not be much different because of the comparatively small radius of the microcells 160. At least in part because of the limited size of the microcells 160, the network may find it difficult to adjust the capacity of the microcells 160 through cell extension and/or cell breathing. Furthermore, the comparatively small dynamic range 170 of the measured power within the microcells 160 may not distinguish or differentiate between user equipment, which may make redistribution very sensitive to power measurement bias and potentially lead to on/off redistribution. Simply extending the range of the microcells 160 may cause impact between the microcells 160 and user equipment within the microcells 160.

Referring back to FIG. 1A, hand off and/or reselection of user equipment may be performed based upon the relative sizes of the coverage areas of the macrocells 110 and/or the microcells 115 that can provide wireless connectivity to the mobile units 120, 125. For example, in the illustrated embodiment, the mobile unit 120 is in the idle mode and does not have an active wireless session with the wireless communication system 100. The mobile unit 120 can preferentially reselect between the macrocell 105(3) and the microcell 115 (4), e.g., based on different priorities assigned to the relatively large macrocells 105 and the relatively small microcells 115 by a network control entity 130. For another example, in the illustrated embodiment the mobile unit 125 is in the active mode and has an active wireless session with the wireless communication system 100. The mobile unit 125 can preferentially hand off between the macrocell 105(1) and the microcell 115(5) using measured RSRPs and hysteresis/offset values that are determined based on the relative coverage area sizes of the macrocells 105 and the microcells 115. A time-to-trigger may also be set for the hand off and the times-to-trigger for handoffs between cells of different sizes may be determined based on the relative coverage area sizes.

In one embodiment, the mobile units 120, 125 may also consider their respective speeds when deciding whether to hand off or reselect between the macrocells 105 and the microcells 115. For example, the mobile unit 120 may be stationary or moving relatively slowly (e.g., at speeds of less than or on the order of a kilometer per hour). The mobile unit 120 may therefore be relatively likely to remain within the coverage area of the microcell 115 and so may preferentially hand off or reselect so that it is served by a microcell 115. For another example, the mobile unit 125 may be moving at a relatively high velocity or speed as indicated by the arrow 135 (e.g., at speeds larger than a kilometer per hour). The moving mobile unit 125 may hand off/reselect at an undesirably high rate if it is receiving service from microcells 115 because of the short cell crossing time for the mobile unit 125. The mobile unit 125 may therefore preferentially hand off/reselect so that a macrocell 105 is the serving cell for the mobile unit 125.

Figure 2:
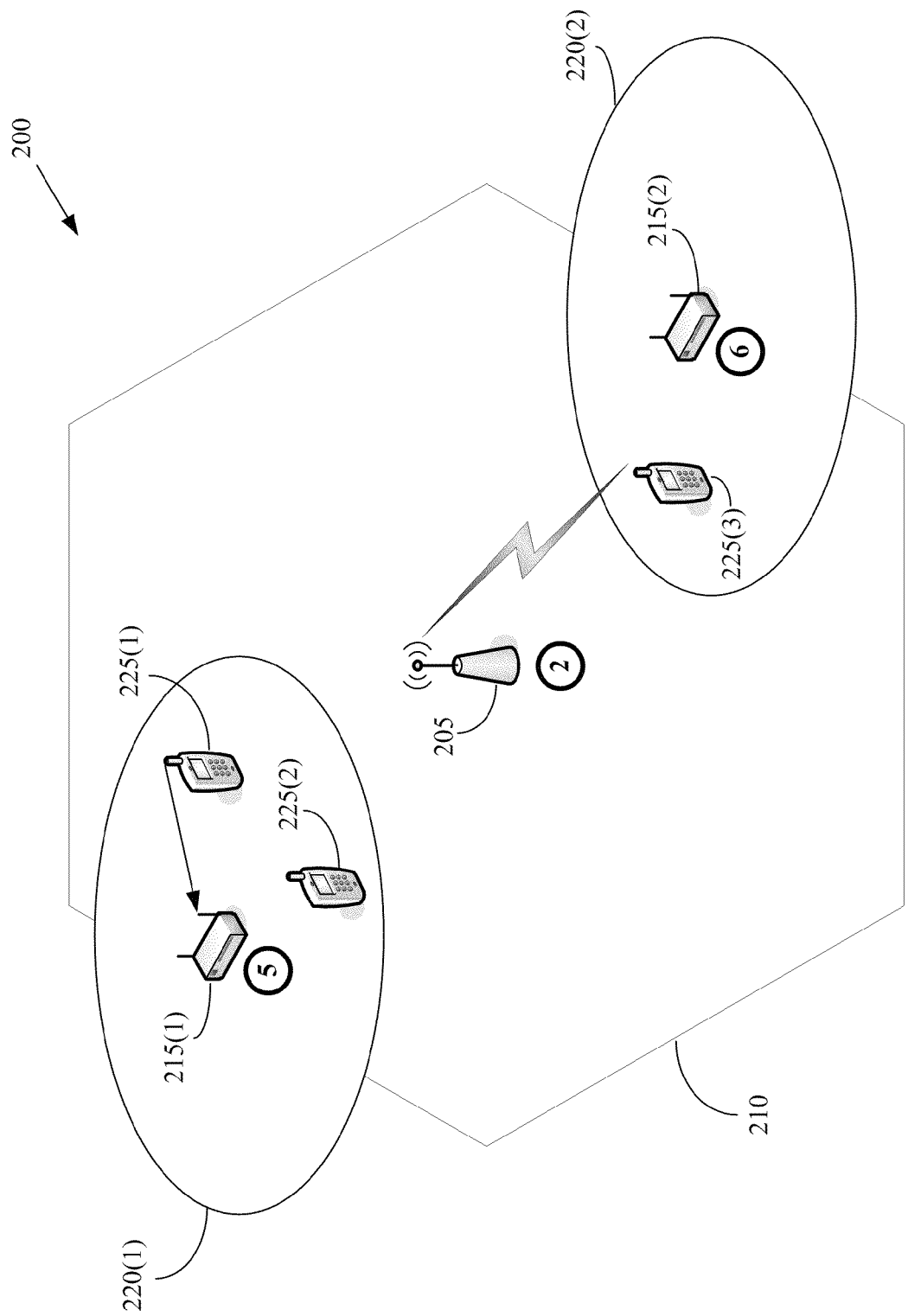
FIG. 2 conceptually illustrates a third exemplary embodiment of a wireless communication system.

FIG. 2 conceptually illustrates a third exemplary embodiment of a wireless communication system 200. In the illustrated embodiment, the wireless communication system 200 includes a base station 205 that provide wireless connectivity within a macrocell 210. The wireless communication system 200 also includes access points 215 that provide service within microcells 220. The exemplary microcells 220 at least partially overlap with the macrocell 210. Mobile units 225 are distributed throughout the macrocell 210 and the overlapping microcells 220. In the illustrated embodiment, the mobile units 225(1-2) are in the idle mode and the mobile units 225(3) is in the active mode and has an established wireless communication with the base station 205 that serves the macrocell 210.

The idle mobile units 225(1-2) can decide whether to perform cell reselection between the macrocell 210 and the microcell 220(1) using a priority-based scheme. In the illustrated embodiment, priorities are assigned to the base station 205 and the access points 215. For example, a priority of 2 is assigned to the base station 205, a priority of 5 is assigned to the access point 215(1), and a priority of 6 is assigned to the access point 215(2). These priorities are selected to lie within a range extending from a minimum value of 0 to a maximum value of 7, although these ranges are matters of design choice. The priorities are assigned so that differences in the values of the priorities are associated with a degree of preference for idle traffic redirection to other carriers/access devices. For example, the relatively low value of the priority assigned to the base station 205 compared to the priorities assigned to the access points 215 indicates a preference for idle mode reselection to the microcells 220.

Priority values may be broadcast or transmitted to the mobile units 225 using paging messages so that the mobile units 225 have the information needed to determine whether to perform the cell reselection. In one embodiment, system information can be broadcast from the macrocells 210 and/or the microcells 220 to indicate a common small cell priority for the microcells 220 and/or to indicate individual priorities for each microcell 220. Each microcell 220 may alternatively broadcast a per-cell based reselection probability value. User equipment may then reselect a target cell with the reselection probability when the user equipment determines that the priority of the target cell is higher than the serving cell priority. In one alternative embodiment, the network can page user equipment in different paging groups to provide the reselection parameters. For example, if there are 10 paging groups and the network would like to redistribute 30% of the idle user equipment to other carriers or cells, three of the paging groups can be used to notify user equipment in that group of the reselection parameters including modified selection/reselection priorities for the carriers or cells. For another example, a global page including information such as reselection probabilities can be used to signal redistribution. Alternatively, periodic broadcast messages can be used to convey the reselection probabilities. User equipment may then perform the reselection at the probability indicated in the message. Additional information may be added to the paging message such as information instructing user equipment to consider their current serving carrier or cell as barred and to reselect to a different target carrier or cell.

In the illustrated embodiment with priority broadcast, the idle mobile units 225(1-2) determine whether to reselect by randomly choosing a number between the priority of the current serving cell and the maximum value of the priorities assigned to the cells. For example, if the idle mobile units 225(1-2) are being served by the base station 205, then they may randomly choose a number between 2 and 7. The idle mobile unit 225(1) may randomly choose a value of 4, which is lower than the 5 priority of the access point 225(1), so the idle mobile units 225(1) may perform a reselection to the access point 215(1). The idle mobile unit 225(2) may randomly choose a value of 6, which is higher than the 5 priority of the access point 225(1), so the idle mobile units 225(2) may not perform a reselection to the access point 215(1). In some embodiments, the access networks may also provide additional factors used to perform the biased reselection. For example, the access network may provide priority values that reflect the loading conditions of a carrier as well as mobility state threshold for supporting reselection.

In one embodiment, the traffic distribution of idle mobile units 225 can be controlled and/or modified based on link condition and/or loading between macro cells 210 and microcells 220 that use different carriers. For example, a priority loading-based approach for RRC_IDLE state mobile units 225 can be implemented with fractional idle traffic redistribution (soft reselection) mechanisms. In one case, the microcells 220 are part of a small cell cluster that uses different carriers than the macrocell 210. System information including an inter-frequency neighbor list can be broadcast, e.g., using a System Information Block type 5 (SIB5) message. The message can be modified so that the mobile units 225 generate a serving priority from a random variable that is uniformly distributed between a cell reselection priority of the current serving carrier and a maximum value. The serving priority may be generated when the current serving carrier's priority value is less than the priority of a target carrier. The mobile units 225 can then compare the self generated serving priority with the cell reselection priority of the target carrier to make the reselection decision.

Alternatively, if the small cell cluster uses the same carrier as the macrocell 210, then messages such as the SIB4 message that includes the intra-frequency neighbor list can be enhanced for both the macrocell 210 and the microcells 220. In one embodiment, the messages include identifiers for the cells in the identifier list that includes identifiers for the overlapped and neighboring microcells 220. Information indicating that the microcells 220 are small cells (relative to the macrocell 210) can be associated with the small cell identifiers and a cell reselection priority can also be associated with these identifiers. The mobile units 225 may then generate a serving priority from a random variable that is uniformly distributed between a cell reselection priority of the current serving carrier and a maximum value, as discussed herein. The mobile units 225 can then compare the self generated serving priority with the cell reselection priority of the target carrier to make the reselection decision.

The network may be able to control the probability of a mobile unit 225 reselecting a particular target cell by controlling the priorities of the cells 210, 220. Thus, the network may be able to control or determine the percentage of the idle traffic distribution among the carriers/cells. For example, if the cell 210 is the serving cell and the cell 220 is the target cell, the SIB3 and SIB5 sent by E-UTRAN via cell 210 may indicate that the CellReselectionPriority of cell 210 is 2 and the CellReselectionPriority of carrier for cell 220 is 6. Then the idle mobile units 225 camping on the carrier for cell 210 may randomly generate a ServingPriority value between 2 to 7. The mobile units 225 on cell 210 with self generated serving priority=2, 3, 4, 5 can reselect to cell 220 as long as the link quality is sufficient to support a healthy call. Mobile units 225 that have a self generated serving priority=6, 7 stay with cell 210. In this case, 66% of idle traffic may therefore be redistributed from cell 210 to cell 220. By setting different priority values, different idle traffic distribution ratio could be achieved.

In one embodiment, idle mobile units 225 may be directed to the microcells 220 to reduce or donate reverse link interference from user equipment connected to the macrocells 210. Relatively high speed user equipment may preferentially camp on the macrocell 210. In one embodiment, idle mobile units 225 camping on the macrocell 210 may reselect to the closest microcells 220 before access is started in the overlapped area, e.g. when initiated by the user equipment or due to paging by the network.

The active mobile unit 225(3) may decide whether to perform a hand off based upon measured values of the RSRPs from the serving cell and the neighbor cell, as well as hysteresis/bias offset/time-to-trigger values. In the illustrated embodiment, the active mobile units 225(3) can determine whether to perform a handoff from the serving macrocell 210 to the overlapping neighbor microcell 220 using parameters that are determined based upon the relative sizes of the macrocell 210 and the neighbor microcell 220. In one embodiment, unicast redirection mechanisms may be used for active mode traffic load balance. Alternatively, a broadcast redirection method may also be used.

Figure 3:
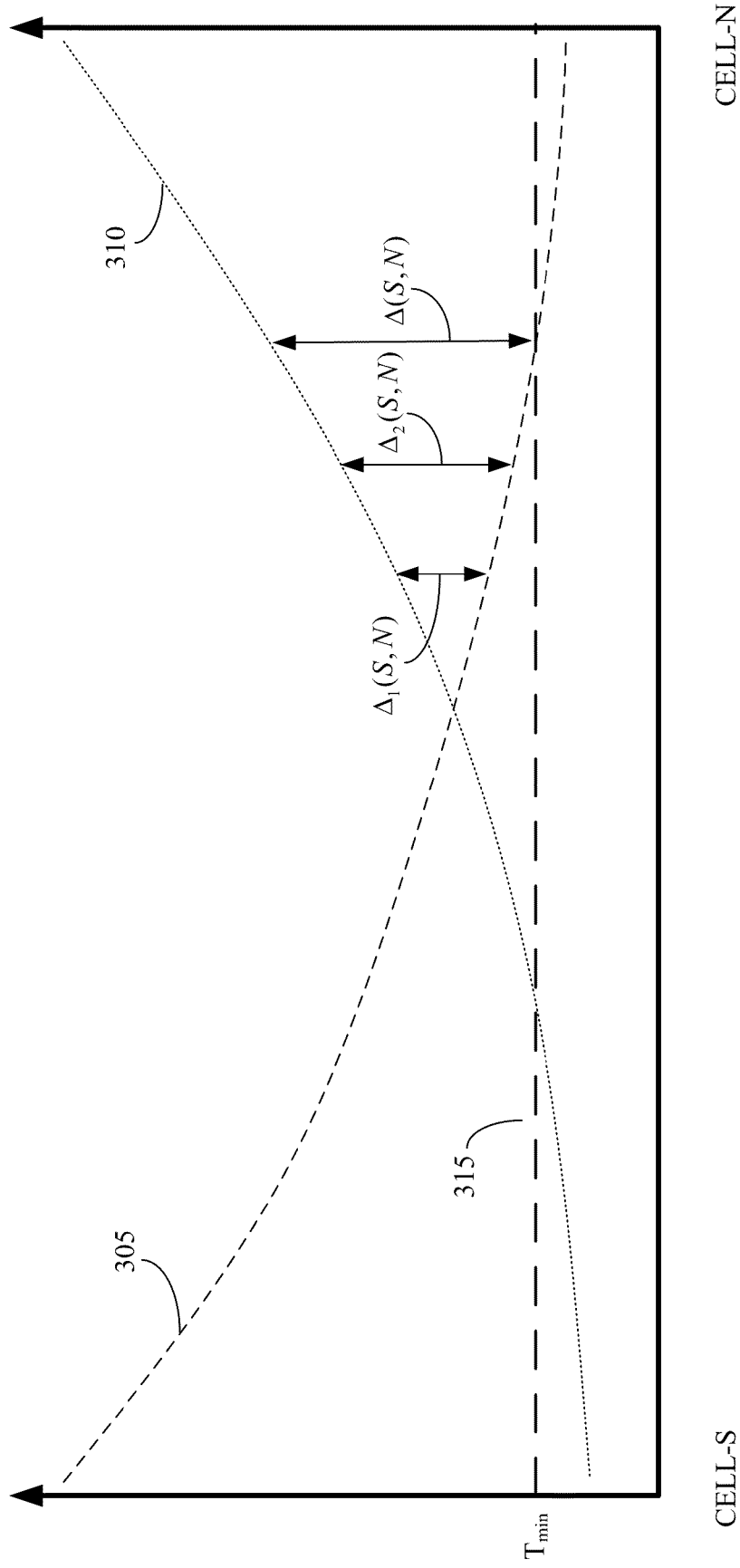
FIG. 3 conceptually illustrates one embodiment of a geometric approach to determining handoff parameters based on relative cell sizes and/or coverage areas.

FIG. 3 conceptually illustrates one embodiment of a geometric approach to determining handoff parameters based on relative cell sizes and/or coverage areas. In the illustrated embodiment, location of a serving cell (cell-s) and a neighbor cell (cell-n) are depicted along the horizontal axis. The units of the distance separating the two cells are arbitrary. The vertical axis indicates a measure of the signal strength received by a mobile unit, such as a reference signal received power (RSRP). The units of the received signal strength along the vertical axis are arbitrary. The received signal strength for a reference signal transmitted by the serving cell is indicated by the curve 305 and the received signal strength for a reference signal transmitted by the neighbor cell is indicated by the curve 310. In one embodiment, the curves 305, 310 can be determined using a known or estimated morphology of the cell deployment and the environment near the cells. For example, a path loss model can be used to determine the propagation loss and/or fading coefficients based on parameters determined from the known morphology such as cell locations, antenna orientations, antenna tilts, the RF propagation captured as a maximum allowed path loss, and the like. However, persons of ordinary skill in the art having benefit of the present disclosure should appreciate that other techniques for determining the curves 305, 310 may be used in alternative embodiments.

In order to maintain a healthy call, mobile units expect signals at a minimum received signal strength level of $T_{min}$. The quality of the user experience may be degraded (and the call may be dropped) when the received signal strength level drops below $T_{min}$. A mobile unit that is initially using the serving cell can therefore maintain a healthy call until the mobile unit travels far enough from the serving cell that the reference signal received power indicated by the curve 305 falls below the minimum received signal strength level indicated by the dashed line 315. At that point, the difference between the curves 305, 310 is given by $\Delta(s,n)$. Handoff from the serving cell to the neighbor cell should be triggered when $T_n - Q_{offset}(s,n) > T_s + Q_{hyst}$, which corresponds to a signal strengths from the neighboring cell of $T_n > T_s + Q_{hyst} + Q_{offset}(s,n)$. In this equation, $T_n$ and $T_s$ are values of the reference signal received power from the serving cell and the neighboring cell, respectively, as they are measured by the mobile unit. However, handoff may be disrupted and the call potentially dropped before, during, or after the handoff if the handoff parameters are not correctly determined. For example, if the parameters are set so that $Q_{hyst} + Q_{offset}(s,n) > \Delta(s,n)$ handoff of the mobile units will not be triggered until the mobile unit has moved into a region where the reference signal received from the serving cell is too weak to support a healthy call. The parameters should therefore be set so that $Q_{hyst} + Q_{offset} \leq \Delta(s,n)$.

The handoff parameters may also be determined based on the relative sizes of the serving and neighbor cells. For example, if the serving cell is relatively larger than the neighbor cell and the wireless service provider is to preferentially direct active mobile units to the smaller cells, then the bias parameters can be set so that handoffs occur at $Q_{hyst} + Q_{offset}(s,n) \leq \Delta_2(s,n)$, whereas the bias parameters can be set so that handoffs occur at $Q_{hyst} + Q_{offset}(s,n) \leq \Delta_1(s,n)$ to preferentially direct active mobile units to the larger cells. Similarly, the time-to-trigger can be reduced to indicate a preference for the associated handoff direction and increased to inhibit the corresponding hand off direction. Persons of ordinary skill in the art having benefit of the present disclosure should appreciate that different embodiments may use different combinations of the handoff parameter values, and may assign these parameter values to different combinations of cells, based upon the particular context and factors such as link conditions, relative number of users per cell, power consumption of the user equipment, overall inter-cell/intra-cell interference, loading factors, speed parameters for the user equipment, and the like.

In one embodiment, a logic-based approach may be used to perform the redirection decision based upon multiple factors. For example, the various criteria may be considered by the decision logic according to a priority order. One exemplary priority order would first consider the minimum link quality condition (e.g., $Q_{hyst} + Q_{offset}(s,n) \leq \Delta(s,n)$) and then consider (in order) grade of service, loading condition, speed of the mobile unit, and perhaps other lower priority factors. The decision logic may therefore first determine if the minimum link condition of the current serving cell can be met. If not, the redirection should take place regardless of other factors. On the other hand, if the target link condition is worse than the minimum accepted level then it may not be considered for handoff. If the minimum link condition is met, then a priority value set by dedicated signaling for grade of service may rule over the broadcast priority and other parameters. Moreover, when the system is overloaded, the speed factor may be a secondary consideration.

User equipment mobility may also be considered as a factor affecting the sensitivity of the triggering mechanism for reselection and/or handover. For example, user equipment can be classified into one of three mobility states: high, medium, and low. Conventional techniques place user equipment in one of these mobility states based upon a "speed factor" that is determined using the number of reselections/handoffs performed by user equipment during a given time interval. The handoff parameters for user equipment in the higher mobility states (higher speed factor) is adjusted so that it becomes easier to trigger a reselection/handoff when user equipment is in a higher mobility state. However, heterogeneous networks including overlapping macrocells and microcells of different sizes may operate more effectively and/or efficiently using different criteria to determine the reselection/handoff parameters. For example, in a heterogeneous network the parameters for handoffs between larger and smaller cells should be adjusted to preferentially bias faster moving user equipment towards reselection/handover to larger cells. For another example, in one embodiment of a heterogeneous network, user equipment may be classified into different mobility states based upon their actual speed, e.g., as determined by detection and/or monitoring logic within the user equipment such as Global Positioning System functionality. The actual speed can differ significantly from the "speed factor" determined based upon the number of selections.

Figure 4:
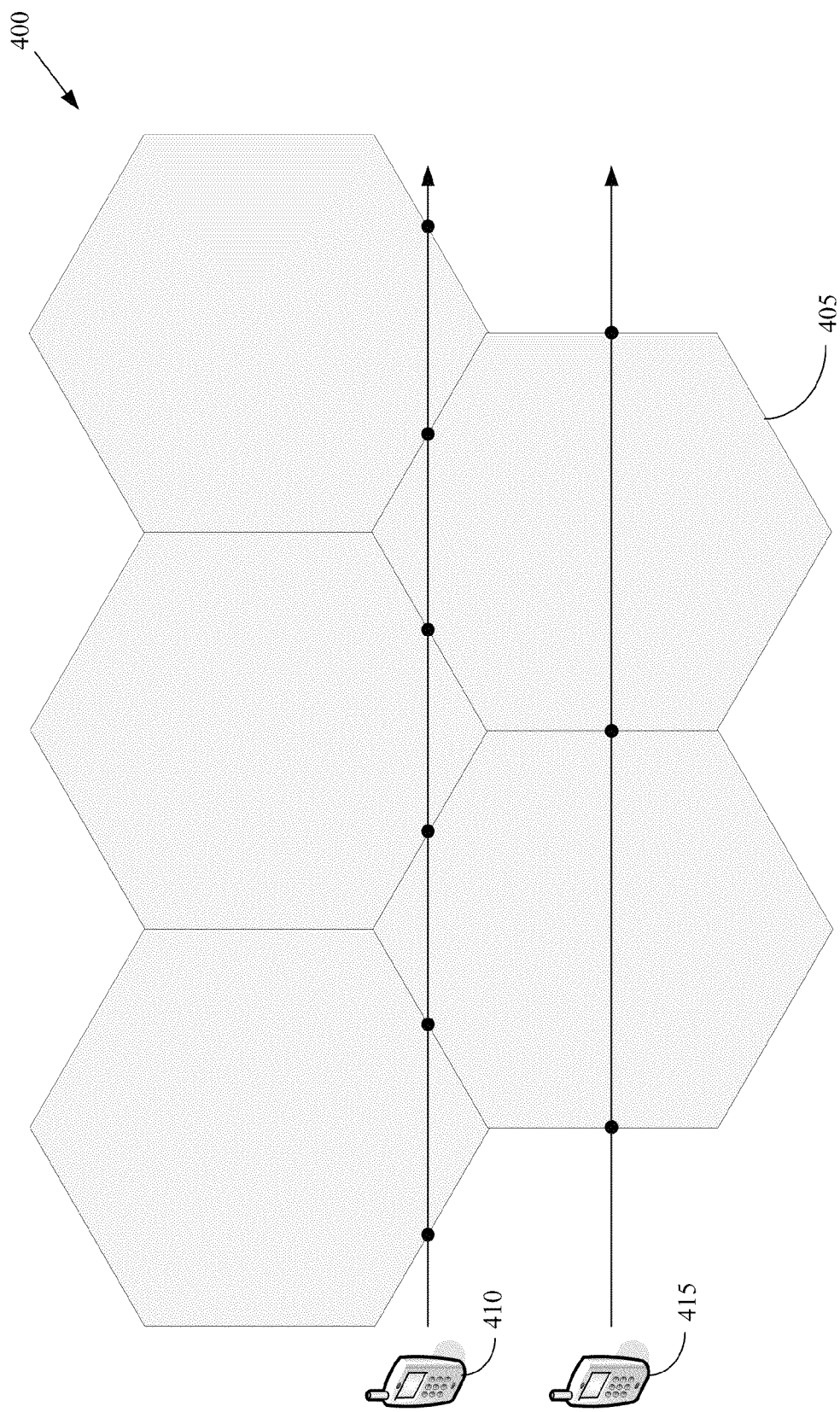
FIG. 4 conceptually illustrates speed factor is determined based upon a number of reselections in a wireless communication system formed of macrocells.

FIG. 4 conceptually illustrates speed factor is determined based upon a number of reselections in a wireless communication system 400 formed of macrocells 405. In the illustrated embodiment, two mobile units 410, 415 are traveling along parallel paths at the same speed. However, the paths of the mobile units 410, 415 intersect the pattern of macrocells 405 at different locations resulting in different numbers of reselections/handoffs when the two mobile units 410, 415 cross the boundaries of the cells 405 (as indicated by filled circles). For example, the mobile unit 410 performs six reselections and the mobile unit 410 performs only three reselections while traveling the same distance at the same speed. The mobile unit 410 therefore has a speed factor that is twice as large as the mobile unit 415, even though the mobile units 410, 415 have the same actual speed.

In one embodiment, user equipment may use its actual speed (and optionally its current location) as a factor controlling the reselection/handoff decision. For example, access networks can determine parameters or thresholds that define one or more speed ranges for the user equipment, such as high/medium/low or high/low. Exemplary threshold velocities or speeds can be used to define low speed mobile units as traveling at less than or approximately 3 km/h and high-speed mobile units as traveling at more than or approximately 30 km/h. The specific number and values of the thresholds can be defined using statistics such as knowledge of the user density associated with different speed than a given coverage area. This information can be measured, determined, and/or stored in the access networks. Access networks can then broadcast instructions to user equipment that indicate when user equipment should always switch to smaller cells, when user equipment should always switch to larger cells, and when the user equipment should preferentially switch between cells of different sizes.

Figure 5:
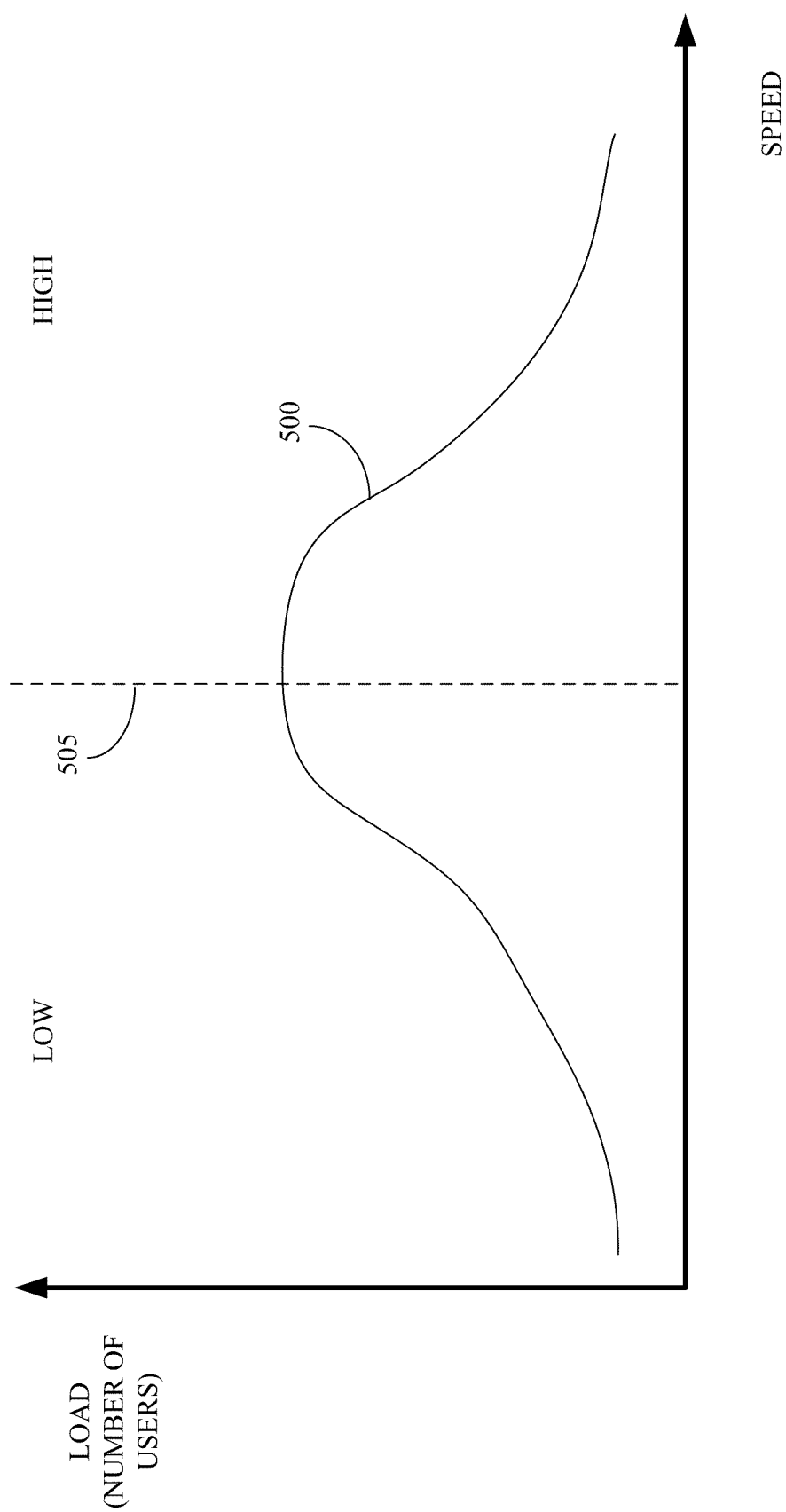
FIG. 5 conceptually illustrates a first exemplary embodiment of a user equipment distribution.

FIG. 5 conceptually illustrates a first exemplary embodiment of a user equipment distribution 500. The vertical axis indicates a load measured in a number of users and the horizontal axis indicates speed of the users in arbitrary units. In the illustrated embodiment, the overall load is relatively low, e.g., the measured load on the access network or system is below a predetermined threshold load. The system therefore may determine that two speed categories are sufficient and may therefore broadcast information indicating a single threshold velocity 505. In the illustrated embodiment, user equipment in the LOW speed category may be instructed to perform soft reselection based on a load balance requirement. For example, user equipment in the LOW speed category may perform soft reselection based upon a comparison of randomly selected user equipment priorities to priorities associated with macrocells and microcells, as discussed herein. In the illustrated embodiment, user equipment in the HIGH speed category may be instructed to stay with the macrocells or reselect to the macrocells.

Figure 6:
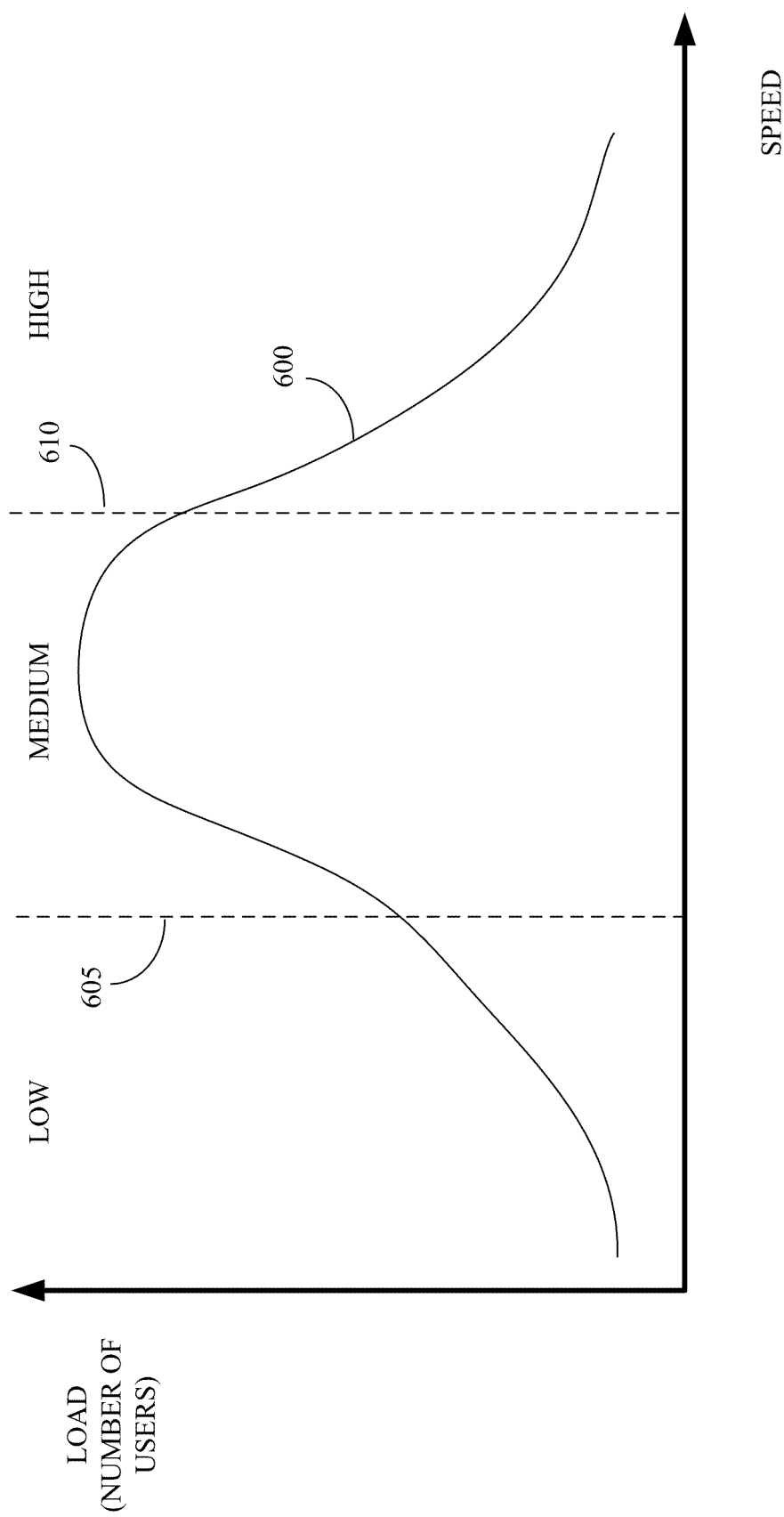
FIG. 6 conceptually illustrates a second exemplary embodiment of a user equipment distribution.

FIG. 6 conceptually illustrates a second exemplary embodiment of a user equipment distribution 600. The vertical axis indicates a load measured in a number of users and the horizontal axis indicates speed of the users in arbitrary units. In the illustrated embodiment, the overall load is relatively high, e.g., the measured load on the access network or system is above a predetermined threshold load. The system therefore may determine that three speed categories should be used as criterion for determining whether to handoffs/reselect. The three speed categories may be defined using the thresholds 605, 610. In the illustrated embodiment, user equipment in the LOW speed category may be instructed to remain associated with smaller microcells or to handoff/reselect from larger cells to smaller cells. User equipment in the MEDIUM speed category may be instructed to perform soft reselection based upon a comparison of randomly selected user equipment priorities to priorities associated with macrocells and microcells, as discussed herein. In the illustrated embodiment, user equipment in the HIGH speed category may be instructed to stay with the macrocells or reselect to the macrocells.

Performing load balancing and traffic distribution/redistribution of idle mobile units between larger cells and smaller cells can also affect the distribution of active mobile units. Current traffic models indicate that the ratio of the number of active user equipment to idle user equipment is statistically approximately a fixed value. The active traffic load may therefore be highly correlated with the idle user equipment density. The access load may therefore be directly associated with the idle user equipment density, which may make the access load a good metric of the idle user equipment density. The access load could therefore be used for idle user equipment distribution measures. A balanced idle traffic distribution may therefore minimize the chance of access congestion and active traffic overload. Balancing the idle traffic distribution may also minimize the chance of service outages and service delays due to the activation of access barring and/or active traffic overload control. Idle mode traffic redistribution mechanisms may also be requested in other circumstances, such as in emergency situations. Redistributing most normal idle user equipment to other cells may help maintain assured access for other privileged user equipment that requires access during emergency situations.

Figure 7:
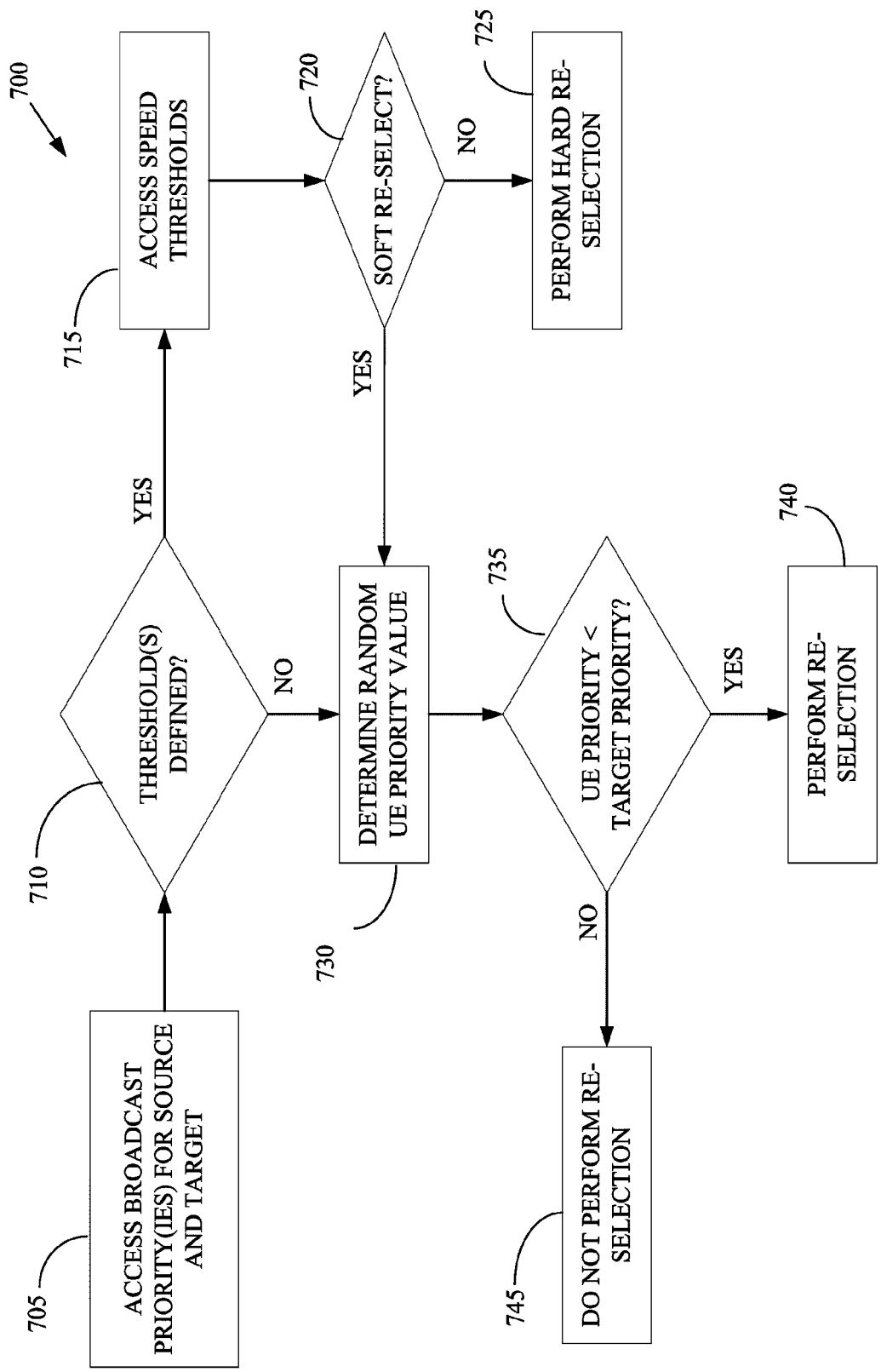
FIG. 7 conceptually illustrates one exemplary embodiment of a method of directing traffic between macrocells and microcells.

FIG. 7 conceptually illustrates one exemplary embodiment of a method 700 of directing traffic between macrocells and microcells. In the illustrated embodiment, user equipment can access (at 705) information indicating relative priorities assigned to a source cell and the target cell. This information may be broadcast to the user equipment by the source cell, the target cell, or both. User equipment then determines (at 710) whether or not mobility should be used as a criterion for determining whether to perform a handoff or reselection. If actual speed thresholds for the user equipment have been defined (at 710), then the user equipment considers mobility and accesses (at 715) the speed thresholds to determine its speed range or category. The user equipment then determines (at 720) whether to perform a soft reselection (e.g., using a randomly determined priority) or a hard reselection. For example, the network may instruct the user equipment in some speed ranges to perform (at 725) a hard reselection to a larger or smaller cell without using the randomly determined priorities, e.g., with 100% probability.

User equipment may also perform soft reselections according to network instructions for a particular speed range or when mobility is not being considered as a criterion. To perform a soft reselection, user equipment may determine (at 730) a random priority value as discussed herein. User equipment then compares (at 735) the random priority value to a priority value assigned to the target cell. In the illustrated embodiment, user equipment performs (at 740) reselection to the target cell when the random priority value is less than the target priority value. Otherwise, user equipment does not perform (at 745) reselection to the target cell.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   determining, at a mobile unit, whether to hand off from a source cell to a target cell based on information indicating sizes of coverage area of the source cell and the target cell, wherein the mobile unit is an idle mobile unit, and wherein determining whether to hand off the idle mobile unit comprises determining whether to hand off by comparing a random serving priority determined by the idle mobile unit using a source cell priority and a target cell priority, the source cell priority and the target cell priority being determined based on the sizes and loading of the source cell and the target cell.

2. The method of claim 1, comprising determining the random serving priority using a uniform distribution between the source cell priority and a maximum priority value.

3. The method of claim 1, comprising determining the source cell priority and the target cell priority based on information broadcast by at least one of the source cell and the target cell.

4. The method of claim 3, wherein the source cell and the target cell share a first carrier, and wherein determining the source cell priority and the target cell priority comprises determining the source cell priority and the target cell priority using information identifying a coverage area of the target cell or the source cell as being relatively smaller than a coverage area of the other cell, said information being broadcast by at least one of the target cell or the source cell.

5. The method of claim 1, wherein the source cell priority and the target cell priority are set so that the mobile unit reselects or hands off to the target cell with a probability that corresponds to a percentage of idle mobile units being redistributed to the target cell.

6. The method of claim 5, wherein determining the source cell priority and the target cell priority comprises determining the source cell priority and the target cell priority using at least one of a global paging message or a periodic broadcast message that includes a probability value indicative of the percentage of idle mobile units being redistributed to the target cell.

7. A method, comprising:
   determining, at a mobile unit, whether to hand off from a source cell to a target cell based on information indicating sizes of coverage areas of the source cell and the target cell, wherein the mobile unit is an active mobile unit, and wherein determining whether to hand off the active mobile unit comprises determining whether to hand off the active mobile unit using a bias offset between the source cell and the target cell, the bias offset being determined based upon sizes of the coverage areas of the source cell and the target cell, at least one of a loading of the sourc cell or a loading of the target cell.

8. The method of claims 1 or 7, wherein determining whether to hand off comprises determining whether to hand off based on a speed of the mobile unit.

9. The method of claim 8, wherein determining whether to hand off comprises preferentially handing off the mobile unit from smaller cells to larger cells when the speed of the mobile unit is above at least one threshold and preferentially handing off the mobile unit from larger cells to smaller cells when the speed of the mobile unit is below said at least one threshold.

10. The method of claim 9, wherein determining whether to hand off comprises determining whether to hand off based upon broadcast information indicating said at least one threshold, and wherein said at least one threshold is determined based upon loading of at least one of the source cell or the target cell.

11. The method of claim 10, wherein determining whether to hand off comprises determining whether to hand off based upon a plurality of thresholds defining a plurality of ranges of the speed of the mobile unit, and wherein the probability of handing off between a larger cell and a smaller cell is different within each of the ranges.

12. The method of claim 8, wherein determining whether to hand off comprises determining whether to hand off based upon ranked criteria comprising a minimum link condition between the mobile unit and the source and target cells, a grade of service for the mobile unit, a loading condition, and the speed of the mobile unit.

13. The method of claims 1 or 7, comprising handing off the mobile unit from the source cell to the target cell.

14. A method, comprising:
   transmitting, from a source cell, information indicating one or more priorities that can be used by a mobile unit to determine whether to hand off from the source cell to a target cell, each priority being determined based on a size of a coverage areas and a loading of the source cell and the target cell, wherein the mobile unit is an idle mobile unit, and comprising performing a cell reselection by the idle mobile unit when a comparison of a random priority determined by the idle mobile unit using a source cell priority is lower than a target cell priority, the source cell priority and the target cell priority being determined based on the sizes of the cell coverage areas and the loading of the source cell and the target cell.

15. A method, comprising:
transmitting, from a source cell, information indicating one or more priorities that can be used by a mobile unit to determine whether to hand off from the source cell to a target cell, each priority being determined based on a size of a coverage areas and a loading of the source cell and the target cell, wherein the mobile unit is an active mobile unit, and comprising receiving a hand off request from the active mobile unit when a reference signal received power from a target cell is larger than a sum of a reference signal received power from the source cell and a bias offset between the source cell and the target cell, the bias offset being determined based upon sizes of the coverage areas of the source cell and the target cell.

16. The method of claims 14 or 15, wherein comprising broadcasting, from the source cell, at least one threshold so that the mobile unit preferentially hands off from smaller cells to larger cells when the speed of the mobile unit is above at least one threshold and preferentially hands off from larger cells to smaller cells when the speed of the mobile unit is below said at least one threshold.

17. The method of claim 16, wherein broadcasting said at least one threshold comprises broadcasting a plurality of thresholds defining a plurality of ranges of the speed of the mobile unit, and wherein the probability of handing off between a larger cell and a smaller cell is different within each of the ranges.

18. The method of claims 14 or 15, comprising handing off the mobile unit from the source cell to the target cell.

* * * * *